US008613096B2

(12) United States Patent
Peinado et al.

(10) Patent No.: US 8,613,096 B2
(45) Date of Patent: Dec. 17, 2013

(54) AUTOMATIC DATA PATCH GENERATION FOR UNKNOWN VULNERABILITIES

(75) Inventors: Marcus Peinado, Bellevue, WA (US); Weidong Cui, Redmond, WA (US); Jiahe Helen Wang, Issaquah, WA (US); Michael E. Locasto, Miller Place, NY (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 11/948,681

(22) Filed: Nov. 30, 2007

(65) Prior Publication Data

US 2009/0144827 A1 Jun. 4, 2009

(51) Int. Cl.
*H04L 29/06* (2006.01)

(52) U.S. Cl.
USPC .......................................................... 726/25

(58) Field of Classification Search
None
See application file for complete search history.

(56) References Cited

U.S. PATENT DOCUMENTS

| | | | | |
|---|---|---|---|---|
| 6,088,804 | A * | 7/2000 | Hill et al. | 726/25 |
| 6,584,569 | B2 * | 6/2003 | Reshef et al. | 726/25 |
| 2003/0009696 | A1 * | 1/2003 | Bunker et al. | 713/201 |
| 2003/0037258 | A1 * | 2/2003 | Koren | 713/201 |
| 2005/0044406 | A1 * | 2/2005 | Stute | 713/201 |
| 2005/0138413 | A1 * | 6/2005 | Lippmann et al. | 713/201 |
| 2005/0138426 | A1 | 6/2005 | Styslinger | |
| 2005/0166072 | A1 * | 7/2005 | Converse et al. | 713/201 |
| 2005/0188215 | A1 | 8/2005 | Shulman et al. | |
| 2005/0273854 | A1 * | 12/2005 | Chess et al. | 726/22 |
| 2006/0021054 | A1 * | 1/2006 | Costa et al. | 726/25 |
| 2006/0130146 | A1 * | 6/2006 | Choi et al. | 726/25 |
| 2006/0137009 | A1 * | 6/2006 | Chesla | 726/22 |
| 2006/0191010 | A1 * | 8/2006 | Benjamin | 726/23 |
| 2006/0195588 | A1 | 8/2006 | Pennington et al. | |
| 2006/0265750 | A1 * | 11/2006 | Huddleston | 726/24 |
| 2006/0288220 | A1 | 12/2006 | Pennington et al. | |
| 2007/0006314 | A1 | 1/2007 | Costa et al. | |
| 2007/0044153 | A1 | 2/2007 | Schuba et al. | |
| 2007/0050678 | A1 | 3/2007 | Estes et al. | |
| 2007/0097963 | A1 * | 5/2007 | Thermos | 370/352 |
| 2007/0112824 | A1 | 5/2007 | Lock et al. | |
| 2007/0174917 | A1 * | 7/2007 | Guruswamy | 726/25 |
| 2007/0271614 | A1 * | 11/2007 | Capalik | 726/23 |

OTHER PUBLICATIONS

Abbes et al. Protocol Analysis in Instrusion Detection Using Decision Tree Proceedings of the International Conference on Information Technology: Coding and Computing (ITCC '04) vol. 1, Apr. 5-7, 2004, Las Vegas, Nevada, USA. IEEE Computer Society 2004; pp. 404-408.*

Cui, et al. "Shield Gen: Automatic Data Patch Generation for Unknown Vulnerabilities with Informed Probing" (2007) IEEE Symposium on Security and Privacy, Oakland, CA, May 2007, 15 pages.

(Continued)

*Primary Examiner* — David Pearson

(57) ABSTRACT

The claimed subject matter provides a system and/or method that generates data patches for vulnerabilities. The system can include devices and components that examine exploits received or obtained from data streams, constructs probes and determines whether the probes take advantage of vulnerabilities. Based at least in part on such determinations data patches are dynamically generated to remedy the hitherto vulnerabilities.

23 Claims, 9 Drawing Sheets

(56) References Cited

OTHER PUBLICATIONS

Costa, M. et al.; "Vigilante: End-to-End Containment of Internet Worms"; Proceedings of ACM Symposium on Operating Systems Principles; vol. 39, No. 5; Oct. 2005; Brighton, UK; pp. 133-147.
Wang, X.F. et al.; "Packet Vaccine: Black-box Exploit Detection and Signature Generation"; Proceedings of the 13$^{th}$ ACM CCS; 2006.
Sidiroglou, S. et al.; "Countering Network Worms through Automatic Patch Generation"; Columbia University Technical Report CUCS-029-03; Nov. 2003; New York, NY.
Liang, Z. et al.; "Automatic Synthesis of Filters to Discard Buffer Overflow Attacks: A Step towards Realizing Self-Healing Systems"; Proceedings of the 14$^{th}$ USENIX Annual Technical Conference; Apr. 2005.

* cited by examiner

AUTOMATIC DATA PATCH GENERATION FOR UNKNOWN VULNERABILITIES

BACKGROUND

Recently, there has been a rise in zero-day attacks (e.g., computer threats that expose undisclosed or unpatched computer application vulnerabilities). Unfortunately, current practice in vulnerability analysis and protection generation is generally manual. Zero-day attacks can be considered extremely dangerous as they exploit computer security holes for which no solution is currently available. Usually, zero-day attacks are released before, or on the same day that a particular vulnerability is identified to the public.

Automatic signature generation for zero-day attacks has generated much attention in recent times. Recent attempts to provide solutions to thwart zero-day attacks have included generating attack signatures for a single attack variant, searching for long invariant substrings from network traffic as signatures. Finding multiple invariant substrings from network traffic can include, for example, observing that multiple invariant substrings must often be present in all variants of a worm payload for the worm to function properly. These substrings typically correspond to protocol framing, control data like return addresses, and poorly obfuscated code. Such an approach however suffers from significant false positives and false negatives because legitimate traffic often contains multiple invariant substrings, and such polymorphic attacks could hijack control data without using an invariant substring. Moreover, the foregoing approach generates signatures from network traffic alone. The fundamental drawback of such mechanisms therefore is that carefully crafted attack traffic can mislead them to generate incorrect signatures.

Other approaches employed to overcome zero-day attacks have included leveraging information about vulnerable applications for improving both the accuracy and the coverage of signatures. For example, one technique employs protocol specifications to provide more protocol context to attack signatures and attempts to generalize the signature for observed attack instances. Moreover, the signatures provided are finite state automaton (FSA) inferred from clusters of similar connections or sessions. The edges in the connection-level finite state automata (FSA) can be either fields or messages, and the edges in a session-level finite state automaton (FSA) can be connections. Such an approach generalizes the signatures by replacing certain variable data elements with a wildcard. Shortcomings associated with such an approach are that it is dependent on attack instances observed. This can make resulting signatures too specific. For example, attack variants that make use of different message sequences cannot be captured by this approach. Also, wildcard-based generalizations typically cannot filter attack variants of buffer overrun vulnerabilities. Additionally, the validity of this approach can lead to over generalization and false positives.

Further mechanisms employed to overcome zero-day attacks have included utilization of address-space randomization based zero-day detectors and regular-expression-based protocol specifications to generate signatures for buffer overrun vulnerabilities. These signatures however generally do not contain any protocol context but typically only a pattern matching predicate for a particular protocol message. Signatures without protocol context can result in false negatives when different message sequences lead to the same attack and result in false positives when pattern matching a message at a non-vulnerable protocol state. Further, since these mechanisms use the length of the vulnerable input field as the buffer limit for the buffer overrun condition in the signature; this can cause false negatives for attacks that have shorter buffer length than that of the observed attack instance.

As will have been noted the foregoing techniques for overcoming zero-day attacks have typically focused on and/or have been dependent on attack instances observed. Other approaches for producing signatures to counter zero day attacks have included manipulating packet payloads and observing program reactions to them. Such approaches have involved generating signatures in three steps: (1) constructing probes by randomizing address like strings; (2) detecting exploits (e.g., code fragments or sequences of commands that take advantage of vulnerabilities in order to cause unintended or unanticipated behavior to occur in computer software and/or hardware) by observing memory exception upon probe utilization; and (3) generating signatures by finding in the attack input the bytes that cannot take random values. In step (3), probes are typically constructed for each byte other than the address string by randomizing its value. Nevertheless this approach has two limitations. First, the probing scheme randomizes each byte rather than leveraging data format information. Such a strategy generates significantly more probes particularly when multiple messages are involved in an attack. Additionally, the scheme works more reliably for text based protocols than binary ones because of a lack of protocol knowledge for binary data formats. Second, the approach can only detect control flow hijacking attacks. For example, such an approach cannot detect exploits of Windows Metafile (WMF) vulnerabilities.

A further signature generation approach to counteract zero-day attack vulnerabilities, and more particularly, to find attack invariants has been to flip bits of original attack data to generate probes. However, such an approach can be prohibitively expensive and on the whole can be impractical.

Yet another strategy for automatic signature generation utilizes program analysis for binary or source code. For example, one modality employs dynamic data flow analysis over the execution on attack input and generates a signature in the form of symbolic predicates. Such attack signatures generated by such dynamic data flow analysis can be inherently specific to the attack input used in the data flow analysis. A further methodology that can be adopted utilizes static program analysis to extract the program logic that processes the attack data and triggers the vulnerability. The extracted logic can be expressed in the form of Turing Machines, symbolic predicates, or regular expressions as vulnerability signatures. Turing Machine-based signatures typically however may not terminate, and regular expressions are not sufficiently expressive for many vulnerabilities.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter provides a system that automatically generates data patches or vulnerability signatures for vulnerabilities, given a zero day attack instance. The claimed subject matter leverages knowledge of data formats to generate new potential attack instances called probes, and detects, predicts, and/or determines if instances can exploit vulnerabilities; the determination and/or prediction can then be utilized to locate further vulnerability signatures. Typically, the generated signatures have no false positives and generally a low rate of false negatives. Further, the generated signatures are significantly more precise than signatures generated by existing schemes. Moreover, the claimed subject matter can produce high-quality signatures for a large portion of currently known vulnerabilities and further, the signatures produced by the claimed subject matter are superior to those signatures generated by existing schemes and methodologies.

In accordance with an illustrative aspect, the subject matter as claimed generates new attack instances based on a single attack instance along with a data format specification without relying on just observed attack instances. Moreover, the signature generalization process employed by the claimed subject matter can include a validation aspect. Further, signatures generated by the claimed subject matter can incorporate the protocol context in which attacks can happen, such as at what protocol state an attack occurred. Additionally, the claimed subject matter can discover buffer limits, where such discovery can be based at least in part on dynamic flow analysis. Discovery of buffer limits typically can yield zero false positives and harmless false negatives. Furthermore, the coverage provided by the signatures generated by the claimed subject matter is much greater because of the use of data format-informed probing.

In accordance with a further illustrative aspect, the claimed subject matter provides data patch generation for vulnerabilities with informed probing. The subject matter as claimed can receive or obtain data streams that can contain exploits and thereafter can construct probes and determine whether these constructed probes uncover vulnerabilities. Where vulnerabilities are identified the subject matter as claimed can dynamically generate data patches that can be utilized to remedy these hitherto vulnerabilities.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
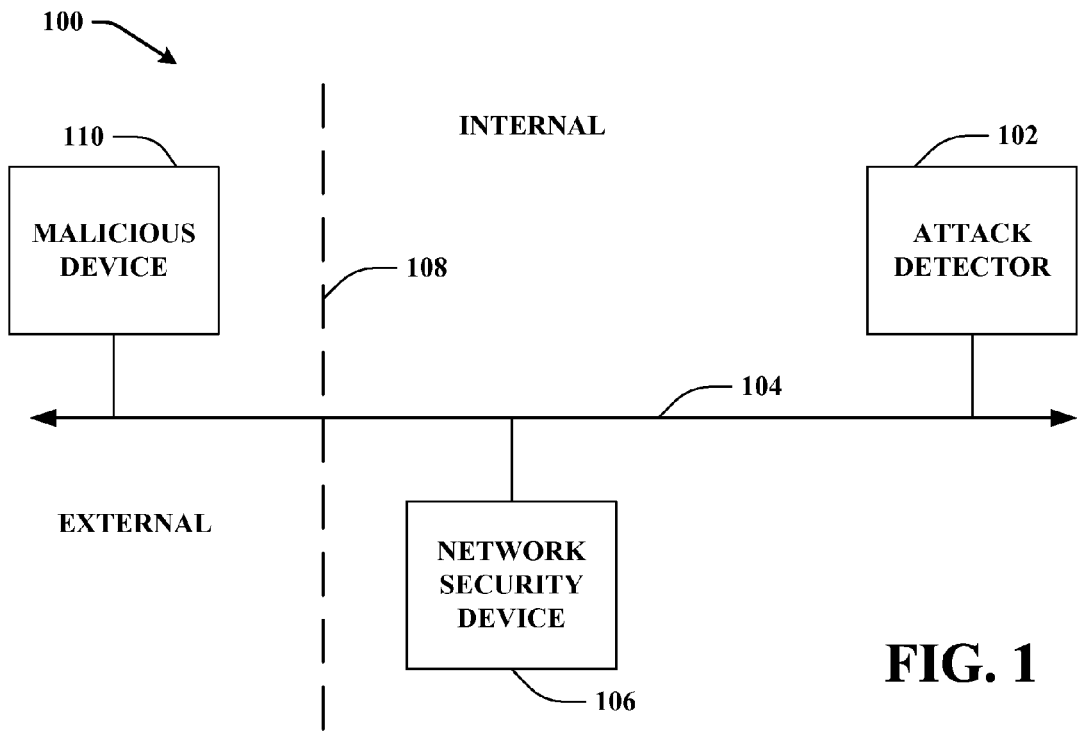
FIG. 1 illustrates a machine-implemented system that automatically generates data patches for vulnerabilities with informed probing in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

In the face of the rise in attacks that exploit vulnerabilities and the current practice of manual protection generation, the subject matter as claimed automates the process and enables fast, accurate patch-level protection generation for vulnerabilities, given the observation of an exploit (e.g., software code, code fragment, or sequence of commands that take advantage of vulnerabilities in order to cause unintended and unanticipated behavior to occur in machine software and/or hardware) of the vulnerability.

In particular, the claimed subject matter provides fast, patch-level protection in the form of data patches rather than the more traditional software patch. A data patch typically can serve as a policy for a data filter, and is generally based on vulnerabilities and/or software flaws that require protection. The data filter can utilize the data patch to identify parts of input data to cleanse as input data is being consumed. As a result, the sanitized data stream will not exploit the vulnerability. Vulnerability signatures employed by firewalls to filter malicious network traffic are examples of data patches for network input. Similarly, files can be crafted maliciously to exploit vulnerabilities in applications that consume file input. With the rise of such exploits, anti-virus software vendors have started using vulnerability signatures for data files to defend against new attack variants. It should be noted that the terms "data patch" and "vulnerability signature" can be, and have with out limitation been employed interchangeably herein. The term "data patch" when emphasizing its purpose as a patch and the term "vulnerability signature" when emphasizing its form as a signature.

By being data-driven, data patches can take the form of signatures that can be automatically distributed and enacted on vulnerable hosts. This style of protection generally cannot be achieved by traditional software patches since applying software patches is inherently user-driven. Even with automatic patch download, users often still need to enact the downloaded patch by restarting the application or rebooting the machine. Further, in enterprise environments, patches are typically tested prior to deployment in order to avoid the potential high cost of recovering from faulty patches. In contrast, rolling back data patches is as simple as removing vulnerability signatures.

The subject matter as claimed provides systems and methods for automatically generating data patches for vulnerabilities given attack instances. The system leverages knowledge of data formats to generate new potential attack instances and uses a detector as an oracle in order to guide the search of vulnerability signatures. The system in accordance with an aspect of the claimed subject matter assumes knowledge of data formats of attacks, such as, for example, protocol formats that can be employed by network-based attacks or file formats that can be utilized by file-based attacks. This assumption is reasonable in that the types of data input consumed by applications is typically known, and it is common practice to have data formats specified for purposes of interoperability across vendors, or simply for the purpose of documentation in a proprietary setting.

The claimed subject matter employs an attack detector to detect attacks with high confidence. Detected attacks are sent to the attack detector which thereafter produces data patches to thwart attacks. The detector constructs new potential attack instances, called probes, based at least in part on data format information. The probes can be utilized by the attack detector to ascertain whether these potential attack instances could succeed as real viable attacks. Determinations rendered by the attack detector can provide guidance for the construction of new probes, to discard attack-specific parts of the initial/original attack data as well as retain inherent, vulnerability-specific parts. The attack detector thus provides vulnerability signatures in the form of refinements to data format specifications that embed vulnerability predicates—a set of boolean conditions on data fields. For stateful network-based attacks, the claimed subject matter is able to capture protocol contexts such as, for instance, protocol states at which attack messages are sent.

The number of probes utilized by the claimed subject matter for deriving vulnerability signatures can, for instance, be considered a key measure of its efficiency. Accordingly, the subject matter as claimed minimizes the number of probes by leveraging semantic information and/or constraints in data format specifications. For example, the claimed subject matter can enforce dependency constraints across data fields so that invalid probes will not be generated.

In order to describe the coverage of vulnerability signatures, the notion of Monomorphic Execution Path (MEP) and Polymorphic Execution Path (PEP) can be utilized. The notion of Monomorphic Execution Path (MEP) considers a single execution path from the point at which attack input is consumed to the point of compromise, while Polymorphic Execution Path (PEP) considers many different paths. To date, automatic signature generation utilizing program analysis for binary or source code have typically been Monomorphic Execution Path (MEP) signatures (e.g., execution trace-based methods). It nevertheless has remained an open challenge to generate Polymorphic Execution Path (PEP) signatures in the form of symbolic predicates. One challenge has been the combinatorial explosion in the number of execution paths. Another challenge has been that with potentially large attack data (e.g., a very long/large files maliciously crafted with many iterative elements), the resulting symbolic predicates can contain a large number of conditions (e.g., the number of conditions can grow with the number of iterative elements in the input) many of which are unnecessary and overly restrictive causing high rates of false negatives. Furthermore, in a stateful network-based attack that takes place over a sequence of messages, the vulnerability may only be triggered by the last message, and there maybe other message sequences that can lead to the same last message. In such a scenario, the symbolic predicates generated over the message sequence generally will not detect attacks that use other message sequences to reach the same vulnerability. The claimed subject matter in contrast can cope with these challenges much more easily with knowledge of data formats.

FIG. 1 illustrates a system 100 that automatically generates data patches for vulnerabilities with informed probing. System 100 can include attack detector 102 that continuously and/or sporadically monitors network 104 for attacks (e.g., contained in file inputs) that exploit vulnerabilities (e.g., known and/or unknown), and upon detection of attacks generates vulnerability signatures and/or data patches that can be employed by network security device 106 (e.g. firewalls, and the like) or applications (e.g. antivirus applications effectuated on machines, etc.) to filter malicious network traffic, or files crafted to maliciously exploit application vulnerabilities. Additionally and/or alternatively, attack detector 102 can monitor various associated persistence devices, such as Compact Disks (CDs), Digital Versatile Discs (DVDs), floppy disks, Universal Serial Bus (USB) devices, Secure Digital (SD) cards, etc. (not shown), to uncover attacks that exploit known and/or unknown vulnerabilities. As illustrated, attack detector 102 and network security device 106 can reside within an internal (e.g. secure) protected fragment/segment of network topology 104, such as, an intranet, demarcated in FIG. 1 by internal/external boundary 108, where network security device 106 provides an internal barrier to malicious events that can transpire and be propagated on network 104. As will be readily appreciated by those conversant in the art, the claimed subject matter can find applicability and utility without boundary 108, and accordingly is not necessarily so limited. Also depicted in FIG. 1 is malicious device 110 that can generate or propagate detrimental attacks (e.g., computer threats that expose undisclosed and/or unpatched computer application vulnerabilities, such as, worms, viruses, adware, Trojan horse, spyware, zero-day attacks, and the like). Malicious device 110 can typically be situated external to the internal/external boundary 108 however, as will be appreciated by those reasonably skilled in the art, malicious device 110 can also be located within the internal/external boundary 108.

As depicted, attack detector 102 can be a standalone machine that includes a processor. Illustrative machines that can constitute attack detector 102 can include Personal Digital Assistants (PDAs), cell phones, smart phones, laptop computers, notebook computers, multimedia recording and/or playback devices, consumer devices/appliances, hand-held devices, desktop computers, server computing devices, etc. Additionally and/or alternatively, attack detector 102 can be incorporated as a component within a pre-existing machine, for example, a dedicated server computing device. As indicated above, attack detector 102 can be in continuous and operative, or sporadic but intermittent communication via network topology 104 with network security device 106 and malicious device 110.

Network topology 104 can include any viable communication technology, for example, wired and/or wireless modalities and/or technologies can be employed to effectuate the subject matter as claimed. Moreover, network topology 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed—and/or any combination, permutation, and/or aggregation thereof. Additionally and/or alternatively, network topology 104 can employ power (electricity) line communications wherein power distribution wires are utilized for both the simultaneous distribution of data as well as transmission of power (electricity).

Network security device 106 can, like attack detector 102, be a standalone machine that includes a processor, such as laptop computers, notebook computers, consumer devices/appliances, hand-held devices, desktop computers, server class computing devices, and the like. Additionally and/or alternatively network security device 106 can be incorporated as a component within a pre-existing machine, for example, a dedicated desktop personal computer. Accordingly, network security device 106 can be effectuated in both hardware and/or software and can be configured to permit, deny, or proxy data through a computer network (e.g. network topology 104) that has different levels of trust. The basic utility of network security device 106 can be to transfer traffic between computer networks of different trust levels, for instance. Typical examples of networks of different trust levels are the Internet which can be a zone with no trust and internal networks (e.g., behind, beyond, or within internal/external barrier 108) which can be zones of higher trust. Network security device 106 can thus be employed to prevent network intrusion to a private and/or internal network. In order to effectuate and accomplish its objectives, network security device 106 can, for example, employ network layer and/or packet filtering allowing packets through network security device 106 only where they match established rulesets. Further, network security device 106 can also employ application layer filters wherein all packets traveling to or from applications (e.g., File Transfer Protocol (FTP), Web Browsers, Domain Name Service (DNS), telnet, and the like) can be intercepted and certain of these intercepted packets blocked (e.g., dropping them without acknowledgement to the originator). Additionally and/or alternatively, network security device 106 can be effectuated as a proxy device responding to input packets (e.g., correction requests, and the like) in the manner of an application, whilst blocking other packets. Proxies make tampering with an internal system from an external network more difficult and misuse of one internal system would not necessarily cause a security breach exploitable from outside network security device 106.

Very briefly, malicious device 110 as depicted, like attack detector 102, and similar to network security device 106, can be any standalone machine inclusive of a processing means. Accordingly, malicious device 110 can include cell phones, smart phones, laptop computers, Personal Digital Assistants (PDAs), notebook computers, multimedia recording and/or playback devices, consumer devices/appliances, hand-held devices, desktop computers, server class computing devices, and the like. Alternatively and/or additionally, malicious device 110 can be incorporated in a pre-existing machine, for example, a Personal Digital Assistant (PDA).

Figure 2:
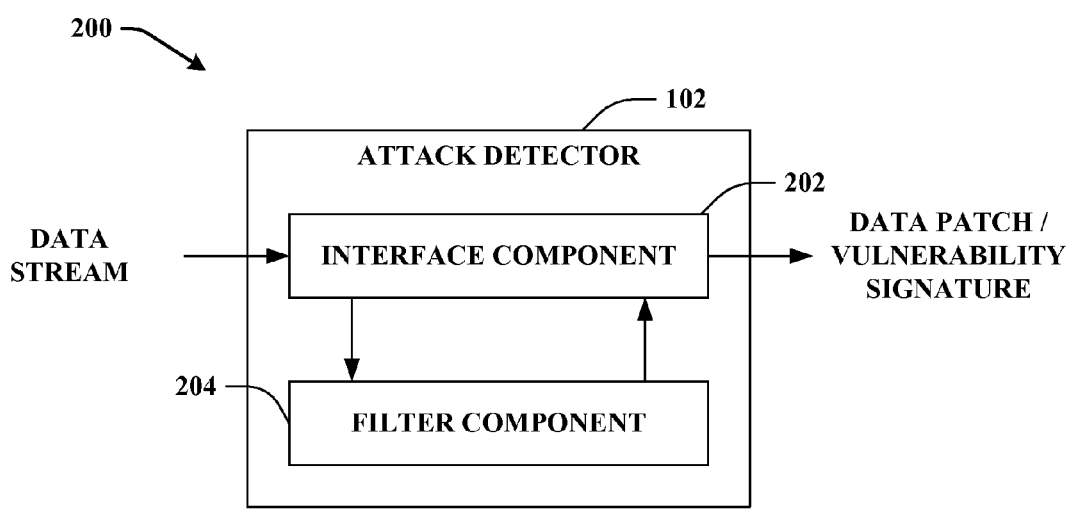
FIG. 2 provides a more detailed depiction of an attack detector in accordance with one aspect of the claimed subject matter.

FIG. 2 provides a more detailed depiction 200 of attack detector 102 that dynamically and automatically generates data patches and/or vulnerability signatures for vulnerabilities with informed probing in accordance with an aspect of the claimed subject matter. Attack detector 102 as illustrated can receive or obtain suspicious data as input (e.g., a data stream, file inputs) and outputs with high confidence whether the data contains an exploit. Suspicious data can be obtained from crash dumps or from honeyfarms (e.g., traps set to detect, deflect, and/or in some manner counteract attempts at unauthorized use of information systems). Attack detector 102 can take many forms. For example, attack detector 102 can utilize dynamic data flow analysis where the detector instruments software that is to be monitored and tracks how its input data (e.g., network packets or files) propagates in an address space as the program executes. Attack detector 102 can thereafter utilize this information to test for a wider range of vulnerability conditions. For example, a simple condition would be to test before executing a ret instruction whether input data has propagated into the return address on the stack. A small set of simple conditions of this type can be sufficient to give this type of detector a very broad coverage for low-level control and data flow vulnerabilities. This can include buffer overflows, arbitrary vulnerabilities that result in code injection or overwriting function pointers or return-to-libc style attacks.

Attack detector 102 in accordance with one illustrative aspect can be based on dynamic data flow analysis and can implement three vulnerability conditions. Attack detector 102 can test for arbitrary execution control (AEC); whether input data is about to be moved into the instruction pointer. Such a test detects attempts to overwrite return addresses on the stack, or function pointers on the stack or heap. Attack detector 102 can also assay for arbitrary code execution (ACE) (e.g., before executing instructions, the detector tests whether instructions depend on a program's input) which detects attempts to execute injected code. Further, attack detector 102 can also test for arbitrary function arguments (AFA) wherein prior to performing certain critical system calls, for instance, creating a process, the detector can check whether certain critical arguments depend on a programs input. Attack detector 102 thus has a low rate of false positives. False positives can accordingly be eliminated completely at the expense of higher rates of false negatives by means of verification processes/procedures.

Attack detector 102 in addition to issuing an alert can also provide detailed information about the exploit and the vulnerability. Such detailed information can include the complete data flow history and application state at the moment the vulnerability was detected. Attack detector 102 can also output the positions within the input stream of the values that triggered the alert. For example, in the case of an arbitrary execution control (AEC) condition, these can be the bytes that were about to be loaded into the instruction pointer. In the case of an arbitrary code execution (ACE) condition, these can be the bytes that were about to be executed. Furthermore, attack detector 102 can output information about the instruction that triggered the alert. For instance, the detector can output whether or not an arbitrary execution control (ACE) alert was triggered while executing a ret instruction (overwritten return address) or indirect jmp or call instructions (overwritten function pointer).

As illustrated attack detector 102 can include an interface component 202 (herein after referred to as "interface 202") that can receive input in the form of a data stream. The input or data stream obtained or received can relate to suspicious data, and can be obtained from crash dumps or from honeyfarms. Interface 202 can thereafter output with high confidence a data patch/vulnerability signature (e.g., whether or not the suspicious data received as input contained exploits) that can be generated by filter component 204. Additionally and/or alternatively, interface 202 can receive data from a multitude of other sources such as client applications, services, users, clients, devices, and/or entities involved with a particular transaction, a portion of a transaction, and thereafter convey the received information to filter component 204 for further analysis.

Interface 202 can provide various adapters, connectors, channels, communication pathways, etc. to integrate the various components included in system 200 into virtually any operating system and/or database system and/or with one another. Additionally, interface 202 can provide various adapters, connectors, channels, communication modalities, etc. that provide for interaction with various components that can comprise system 200, and/or any other component (external and/or internal), data, and the like associated with system 200.

Filter component 204 can instrument applications that are to be monitored and can track how its input (e.g., network packets and/or files) propagate in that application's address space as the application executes. Filter component 204 can utilize this information to test for a wide range of vulnerability conditions. For instance, before executing ret instructions determining whether or not input data has propagated into return addresses on the stack. A small set of vulnerabilities of this type can be sufficient to provide broad coverage for low-level control and/or data flow vulnerabilities, such as, for example, buffer overflows, arbitrary vulnerabilities that can result in code injection or overwriting of function pointers or return-to-libc style attacks.

Filter component 204 can test for impending movement of input data into instruction pointers thereby detecting attempts to overwrite return addresses on a stack, or function pointers on a stack or heap. Further, filter component 204 can, before executing an instruction, test whether or not the instruction depends on the program's input. Such analysis can detect attempts to execute injected code. Additionally, filter component 204 can, before performing critical system calls (e.g., creating a process), check whether certain critical arguments depend on the program's input.

In addition to issuing an alert, filter component 204 can also provide detailed information about the exploit and the vulnerability. This can include a complete data flow history and the application state at the moment the vulnerability was detected. Filter component 204 can thereafter output the positions within the input stream of the values that triggered the alert. For example, filter component 204, in the case of arbitrary execution control (AEC) conditions, can output bytes that were about to be loaded into the instruction pointer. As a further example, filter component 204, in the case of arbitrary code execution (ACE) conditions, can output bytes that were about to be executed. Moreover, filter component 204 can output information about the instruction that triggered the alert. For instance, filter component 204 can output whether an arbitrary execution control (AEC) alert was triggered while executing a ret instruction (e.g., overwritten return address) or an indirect jmp or call instruction (e.g., overwritten function pointer).

Figure 3:
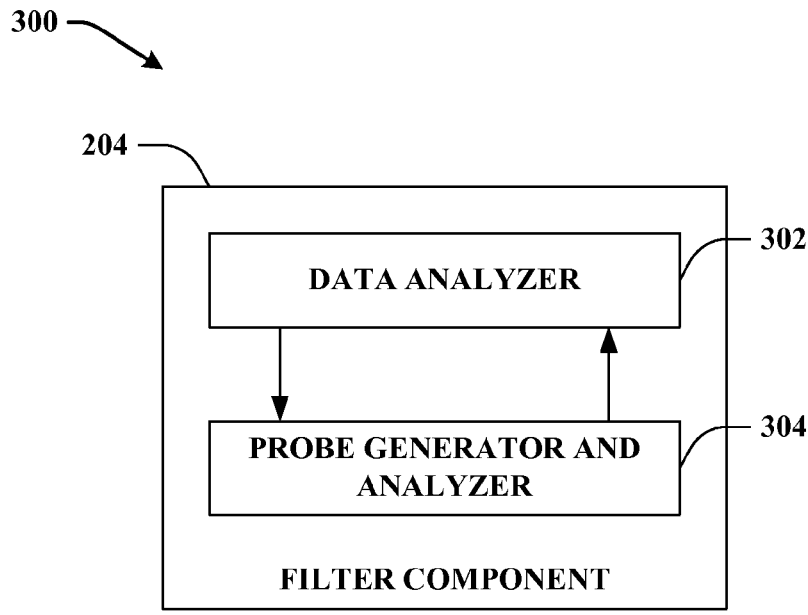
FIG. 3 provides a more detailed depiction of an illustrative filter component that can be employed to create data patches for vulnerabilities with informed probing in accordance with an aspect of the claimed subject matter.

FIG. 3 is a more detailed illustration 300 of filter component 204 that can be employed by attack detector 102 in accordance with an aspect of the subject matter as claimed. As detailed above, filter component 204 can, for example, instrument applications that are to be monitored and track how the application's input propagates in an address space as the application executes, perform analysis before the impending movement of input data into instruction pointers in order to detect attempts to overwrite return addresses on a stack or function pointers on a stack or heap, assess whether or not an instruction depends on the program's input in order to detect attempts to execute injected code, and check whether certain critical arguments depend on a program's input before performing critical system calls.

In order to facilitate the foregoing, filter component 204 can utilize and/or include data analyzer 302 and probe generator and analyzer 304. Data analyzer 302 can parse data according to a data format specification, giving semantics and structure to the raw data. Data analyzer 302 can operate either online or off-line, for example. For instance, when data analyzer 302 operates online it can serve as the main mechanism in data filters to prevent network or file based intrusions, in so doing, data analyzer 302 can perform vulnerability driven filtering of application level protocol traffic and/or prevent file based attacks that exploit file parsing vulnerabilities.

Data analyzer 302 in order to parse data efficiently and effectively can utilize a data format specification that specifies a protocol format using a domain specific language. Recent work has advocated specifying protocol formats using domain specific languages, and then using a generic protocol analyzer runtime to parse protocol traffic according to the specification. These domain specific languages typically are able to map the protocol structure over the raw network data, parsing packets into messages that contain various fields as expressed in the specification, and extracting the protocol state information based on the sequence of messages already parsed. Accordingly, data analyzer 302 can employ a data format specification that specifies a protocol format using a domain specific language, such as a Generic Application-level Protocol Analyzer (GAPA) language to specify protocol formats and for analysis.

A Generic Application-level Protocol Analyzer (GAPA) language specification (e.g., a Spec) can specify message format, protocol state machine, and message handlers (of which there is one per protocol state) and carries out protocol state transitions. The message format can be expressed in an enhanced Backus-Naur Form (BNF) format similar to those utilized in Request for Comments (RFCs). Run-time values of earlier parts of a message can determine how later parts of the message are parsed. For instance, a size field before an item array can indicate the number of items to parse at runtime; a field value in one message can determine how to parse parts of a subsequent message. Such context-sensitive characteristics of data formats are well supported in the Generic Application-level Protocol Analyzer (GAPA) language through enhancing the Backus-Naur Form (BNF) notation and embedding code in the Backus-Naur Form (BNF) rules. Nevertheless, as will be understood by those of ordinary skill in the art, other data format specification languages (e.g., yacc, lex, bison, and the like) can equally be utilized without departing from the intent, spirit, and/or ambit of the claimed subject matter, and as such all such variants and permutations are deemed to fall within the purview of the subject matter as claimed.

It should be noted at this stage that since the data patch generated by the claimed subject matter is a refinement of the data format specification that is to be fed into a data analyzer of a network security device (e.g. network security device 106) or an antivirus program for patch equivalent protection, the refinement can include a vulnerability predicate on fields of the input. If the predicate evaluates to be true the input can be classified as an exploit and removed. In a Generic Application-level Protocol Analyzer (GAPA) language, the predicate can be expressed as a condition in an if-statement that can be inserted into an appropriate data handler. For network data, the data handler can be the message handler at the protocol state at which attacks can happen. To adapt a Generic Application-level Protocol Analyzer (GAPA) language for file data, the entire file can be treated as one message, the protocol state machine specification can contain just one state, and there can be just one data handler.

Data analyzer 302 can thus check whether input (e.g., an attack instance) violates data format constraints (e.g., the number of bytes in a byte array must correspond to the value of its size field). Where data analyzer 302 uncovers violated constraints, such constraints can be conveyed to probe generator and analyzer 304.

Probe generator and analyzer 304 can obtain violated constraints from data analyzer 302, and thereafter can construct probes that satisfy the constraint (e.g. changing the size field to correspond to the size of the byte array in the original attack packet). The constructed probe can thereafter be fed back to the attack detector 102, for example, via a feedback facility, to provide a predictive mechanism whereupon a determination as to the constructed probe's viability to exploit vulnerabilities can be ascertained. If the constructed probe is reported unsuccessful at this stage, namely the constructed probe failed to exploit vulnerabilities, the generated data patch produced by attack detector 102 can simply be the data format specification that enforces the corresponding data format constraint. If on the other hand the probe is successful an attack predicate can be generated. Typically, an attack predicate can be a conjunction of boolean conditions with each data field (of the message used in the attack) equaling the value of the attack input.

Of course, this predicate generally incurs no false positives in attack detection, but nevertheless can be restrictive and generally admits only one attack input as its protocol state. Accordingly, conditions specific to the original attack input can be relaxed by probe generator and analyzer 304 so that more attack variants can be admitted. This can be accomplished by probe generator and analyzer 304 generating probes, potential attack variants, based on the data format and forwarding these to attack detector 102 via a predictive feedback facility (e.g., a facility that based at least in part on the potential attack variants generates predictions as to whether attack variants pose a threat). Thus, if the predictive feedback facility associated with attack detector 102 determines that a generated probe is a new attack variant, probe generator and analyzer 304 can adjust vulnerability predicates so that the confirmed new attack instance can be admitted as well. For example, if all values of a data field have been tried, and the predictive feedback facility associated with attack detector 102 classifies all the corresponding probes as attacks, then that particular field can be categorized as a "don't care" field, and probe generator and analyzer 304 can remove the condition on the data field from the predicate.

One challenge in probe generation can be that probe generator and analyzer 304 must generate legitimate messages that satisfy protocol semantics including session semantics and cross-field correlation in a message. For example, the session ID field of all messages of the session should generally be the same. Some examples of field correlations within a message are: length field=sizeof (all fields), checksum field=checksum (all fields), hash field=hash (another field). It is important that such semantics are obeyed for otherwise answers to illegitimate probes provided by the predictive feedback feature associated with attack detector 102 can be misleading. It should be noted without unnecessary limitation to the claimed subject matter that probes can typically contain multiple protocol messages including those messages that precede the offending message for session initiation and application context setup.

As indicated earlier, the efficiency metric of such a probing scheme can be the number of probes. Some probes can be parallelized while some need to be sequential, namely, construction of a later probe can be dependent on the outcome of an earlier probe. Accordingly, given sufficient attack detectors (e.g., multiple attack detectors 102) parallel probes can be sped up by evaluating probes in parallel.

Since it is typically infeasible to burden the predictive feedback feature associated with attack detector 102 with all combinations of values in each data field that appears in the input, probe generator and analyzer 304 can reduce the number of probes in the following ways.

First, there may be iterative elements in the attack data, such as a sequence of records which may be expressed as "records→record records|nil;" or "itemArray→size:unit8 items:int[byte]" in the data format specification. Such iterative elements can also introduce numerous, repetitive data fields which may not all matter to vulnerability predicate construction (e.g., it could be the case that just a particular iterative element triggers the vulnerability). Because probe generator and analyzer 304 can recognize iterative elements based on the specification, probe generator and analyzer 304 can issue a probe that contains just one element to see whether the number of elements matters; and then based on the answer provided by the predictive facility associated with attack detector 102, probe generator and analyzer 304 can issue subsequent probes. Being able to recognize iterative elements in attacks can significantly reduce the number of probes generated.

Second, by obeying protocol semantics and eliminating illegitimate probes, probe generator and analyzer 304 can reduce the number of probes needed. It is possible that an expressed constraint may not actually be a constraint in an implementation. For example, an application may allow a size constraint to be violated. Accordingly, a probe can be constructed and used to determine whether such a constraint matters.

Additionally, for network input that contains a sequence of messages, it can be highly likely that the vulnerability predicate is only dependent on the last message. This is because vulnerabilities are often localized. Given that message handlers for each message are typically separate code pieces, if an attack happens during the handling of the message, the vulnerability likely affects the message handling for that message only. In this case, having conditions on data fields of earlier messages will cause false negatives in the resulting vulnerability predicate which will not capture the attack variants that take a different message sequence. In other words, it can be assumed that only the contents of the last message determines whether the input exploits the vulnerability and that the data analyzer naturally traces the protocol context before reaching the handler of the last message.

Figure 4:
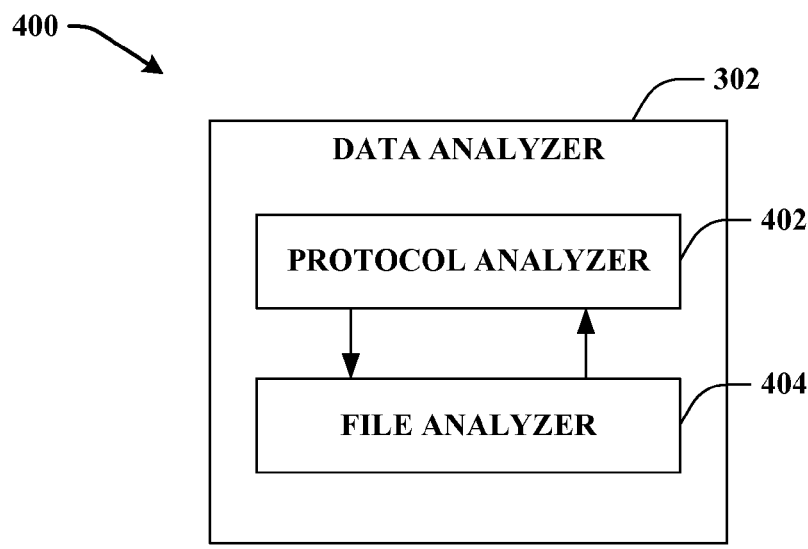
FIG. 4 provides a more detailed depiction of a data analyzer that can be utilized to generate data patches for vulnerabilities in accordance with an aspect of the claimed subject mater.

FIG. 4 provides illustration 400 of data analyzer 302 that can be employed to dynamically and automatically generate data patches and/or vulnerability signatures for vulnerabilities with informed probing in accordance with an aspect of the claimed subject matter. Data analyzer 302 in order to parse data according to data format specifications, thereby providing semantics and/or structure to raw data, and in order to prevent network or file-based intrusions can employ protocol analyzer 402 and file analyzer 404. Protocol analyzer 402 can perform vulnerability-driven filtering of application level protocol traffic; whereas file analyzer 404 can be utilized to prevent file-based attacks that exploit file parsing vulnerabilities.

Each of protocol analyzer 402 and/or file analyzer 404 can utilize protocol formats specified in domain-specific languages, and thereafter employ a generic protocol analyzer runtime to parse protocol traffic according to the specification. The domain-specific language typically can specify message format, protocol state machine, and message handlers (generally one per protocol state) and carries out protocol state transitions. Message formats can be expressed in enhanced Backus-Naur Form (EBNF). Run-time values of earlier parts of a message can determine how later parts of the message are to be parsed. For example, the size field before an item array can be indicative of the number of items to parse at runtime; a field value in one message can determine how to parse parts of a subsequent message.

Figure 5:
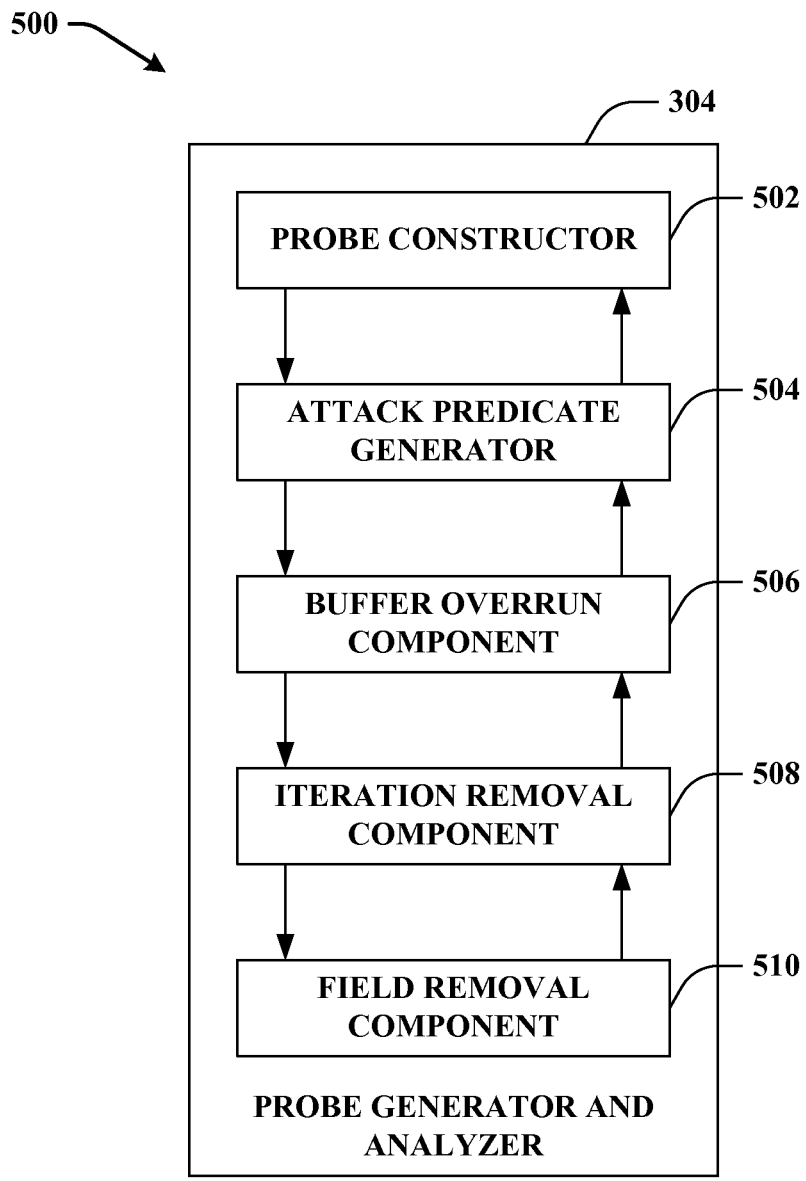
FIG. 5 illustrates a probe generator and analyzer that can be used to produce data patches for vulnerabilities in accordance with an aspect of the claimed subject matter.

FIG. 5 provides depiction 500 of probe generator and analyzer 304 that can be utilized to generate vulnerability signatures for vulnerabilities with informed probing in accordance with an aspect of the claimed subject matter. Probe generator and analyzer 304 can be utilized when attack detector 102 detects an attack, and can also output the byte offset of the offending byte in the input. Typically, the offending byte can fall into an arbitrary field in the input packet.

As illustrated probe generator and analyzer 304 can include probe constructor 502, attack predicate generator 504, buffer overrun component 506, iteration removal component 508, and field removal component 510. Probe constructor 502 can construct probes that satisfy a particular constraint. For instance, probe constructor 502 can change a size field to correspond to the size of the byte array in an original attack packet. Constructed probes generated by probe constructor 502 can be fed back to a prognosticative mechanism affiliated with attack detector 102 so that determinations can be made as to whether or not constructed probes viably exploit vulnerabilities. Where a constructed probe is found not to practicably exploit vulnerabilities, data patches and/or vulnerability signatures generated by attack detector 102 can simply include a data format specification that enforces a corresponding data format constraint. Conversely, where the probe is found to feasibly exploit vulnerabilities, an attack predicate can be generated by attack predicate generator 504.

Attack predicate generator 504 typically can generate an attack predicate that is a conjunction of boolean conditions with each data field of the message utilized in the putative attack equaling the value of attack input. Attack predicates can typically be generated from the attack input itself together with its data format. As has been noted earlier, attack predicates so generated typically do not incur false positives in attack detection. Consequently, such generated attack predicates can be very restrictive, generally admitting but one attack input as its protocol state. In order to counter this, attack predicate generator 504 can attempt to relax conditions specific to the original attack input so that more attack variants can be admitted. Such a relaxation feature can be accomplished by generating probes, potential attack variants, based at least in part on data formats and directing these to a predicative feedback mechanism associated with attack detector 102. Accordingly, if the predicative feedback feature associated with attack detector 102 ascertains that a generated probe can be a new attack variant, attack predicate generator 504 can adjust vulnerability predicates so that confirmed new attack variants can be admitted as well. For instance, where all values of a data field have been tried, and the prognosticative feature affiliated with attack detector 102 categorizes all corresponding probes as attacks, then that particular data field can be flagged as a "don't care field", and attack predicate detector 504 can remove the condition on the data field from the predicate.

Buffer overrun component 506 can be utilized in conjunction with probe constructor 502 and/or attack predicate generator 504 to find out whether buffer overrun vulnerabilities occur. In order to make this determination, buffer overrun component can utilize a heuristic wherein if an offending byte in the input lies in the middle of a byte or unicode string, then buffer overrun component 506 can indicate a buffer overrun condition and can, for example, add the following condition as a refinement:

$$\text{sizeof (buffer)} > \text{offendingByte\_offset} - \text{bufferStart.offset}$$

The rationale for the utilization for the foregoing heuristic and why it is accurate depends on the type of alert generated. In the case of arbitrary code execution (ACE) alerts, if the application were about to execute a ret instruction when the alert is issued then a return address on the stack can be corrupted by input data. It is almost certain that the cause of this condition will be a stack buffer overrun.

If on the other hand the application were about to execute an indirect jmp or call instruction then the corresponding function pointer can contain input data. Even if this does represent legitimate application behavior (e.g., the application intends to use input data as a function pointer), an accurate specification should declare this function pointer as a four-byte integer, and not as a substring of a byte or unicode string.

In the case of arbitrary execution control (AEC) alerts, if the application was about to execute an instruction that originated in the middle of a byte or unicode string in the input. It appears highly likely that this was caused by a buffer overrun.

In the case of arbitrary function arguments (AFA) alerts, the application was about to make a critical system call with a parameter that originated in the middle of a byte or unicode string in the input. If this was legitimate application behavior, this parameter should appear as a separate data field in an accurate specification. In this case, the parameter would not lie in the middle of a larger string field. Again, this is a strong indication of a buffer overrun.

Probe generator analyzer 304 can also include iteration removal component 508. Many popular input formats include arbitrary sequences of largely independent elements (records). For example, HTML files contain sequences of tags. Most audio and video files consist of sequences or chunks compressed audio or video data. Windows metafile (WMF) files can consist of a sequence of drawing command records. In all cases, the file contains a sequence of records. Rendering applications typically have different handler functions for different record types. For instance, Windows metafile (WMF) record types can include Ellipse, Rectangle, or Escape. Each record type can be processed by a corresponding handler function. Vulnerabilities typically can be located in a particular handler function. In this case, any input that contains a malicious record can be considered an attack—irrespective of what other records may exist in the input. This can pose special challenges to execution trace based signature generation mechanisms.

In order to cope with such iterative elements more easily the claimed subject matter can utilize an iteration removal component 508 that removes all iterative elements that are not necessary to exploit a vulnerability. This not only reduces the number of probes needed but also improves the accuracy of the generated signatures. At a high-level the claimed subject matter generates probes from which some of the iterative elements have been removed (e.g., by iteration removal component 508) and thereafter the generated probes can be dispatched to a predictive facility associated with attack detector 102. If the generated probe still exploits the vulnerability then the iterative elements that were removed by iteration removal component 508 can be omitted. Otherwise, one or more of the iterative elements that had been removed can be added as they can be considered necessary.

In the theoretical worst-case, this procedure may not lead to any simplifications of the input—namely if all iterative elements in the input are necessary to exploit a vulnerability. However, for real-world vulnerabilities the procedure can rapidly converge to a probe in which only one or two iterative elements are left.

In accordance with an illustrative aspect of the claimed subject matter, iterative removal component 508 can identify offending data in the input and thereafter map this information to a particular iterative element—the offending element. For instance, given the heuristic observation that typically only one or two iterative elements are necessary to exploit the vulnerability, iterative removal component 508 can generate a first probe by removing all iterative elements except for the offending element. If such a minimal probe does not succeed as an attack, iterative elements that have been removed can be added back into the probe to make it functional, for example. Iteration typically can be hierarchical, namely, an iterative element can have another iterative structure associated with it, and so on. Accordingly, iterative removal component 508 can first add back all iterative elements from the original input at the lowest hierarchical level where the offending byte is located, for instance. This probe, for example, can then be dispatched to the prognosis mechanism associated with attack detector 102. If the prognosis facility perceives the probe as an attack, iterative removal component 508 can attempt to eliminate iterative elements at the lowest level using a divide-and-conquer mechanism: split all iterative elements at this level into N parts (for some N>1, N denoting an integer), for example. Iterative removal component 508 can then construct N parallel probes with each probe dropping one of the N parts. If a probe is successful, the associated iterative elements can be dropped; otherwise, iterative removal component 508 can further divide the 1/N portion of the interactive elements N ways and send another round of parallel probes. Iterative removal component 508 can repeat this until it finds iterative elements that must exist to make a probe functional.

If the offending byte does not belong to any iterative element, or a successful attack has not been obtained after adding iterative elements at all levels around the offending byte, then iterative removal component 508 can commence adding iterative elements that do not contain the offending byte. In this case, iterative removal component 508 can take an approach similar to how elements containing the offending byte were added back. The difference being that iterative removal component 508 approaches adding iterative elements that do not contain the offending byte in a top-down manner, starting from the highest hierarchical level. In accomplishing this, iterative removal component 508 can once again utilize a divide-and-conquer approach to find what elements at the highest level must be added back. Then for each element that must be added back, iterative removal component 508 can go down one level inside it and use the same mechanism to find out what elements in this lower level that must be added back. Iterative removal component 508 can repeat this process until it reaches the lowest level.

Once iterative element removal has been accomplished by iterative removal component 508, field removal component 510 can eliminate "don't care" fields so that probes can be constructed over the remaining data fields, and to locate additional values of the data fields for which an attack succeeds. Sending probes in a combinatoric fashion typically cannot be tolerated as this can result in an exponential number of probes. Instead, field removal component 510 can evaluate k-tuples of fields, where k is an integer greater than 0, setting values of all other fields to their respective values in the original attack input. In order to accomplish this, field removal component 510 can obey the data format semantics elucidated earlier with respect to probe construction.

As will be readily apparent to those of ordinary skill, the heuristics employed by iteration removal component 508 are provided as aids to exposition of the claimed subject matter and should not be construed as limiting or confining the subject matter as claimed. Accordingly, other variations of the aforementioned heuristics can be employed with equal effect and as such any and all such variations, permutations and/or derivatives thereof will be considered to fall within the scope and intent of the claimed subject matter.

Field removal component 510 can employ, without limitation, the following sampling heuristic to further reduce the number of probes for evaluating each field: (1) For any base type data field such as an integer, try its minimum value, maximum value, and sample some number of random values below and/or above the input value. (2) For character strings, generate a random string by taking a random non-zero value for each byte; and send several samples of such random strings. (3) For byte arrays, utilize a random value for each byte rather than non-zero values. When all samples for a field lead to probes that exploit a vulnerability, field removal component 510 can consider the field as a "don't care" field and remove it from the predicate.

At the end of this process, probe generator and analyzer 304 can be left with a set of input fields $f_i$ and values for each fields $V_i$, such that an attack can be triggered where value($f_i$) $\epsilon V_i$ for all i. The output of probe generator and analyzer can be the conjunction of these conditions which can be considered to be an approximation of the vulnerability predicate. Nevertheless, it is possible to have more complex vulnerability conditions that can involve complex calculations on multiple fields.

Figure 6:
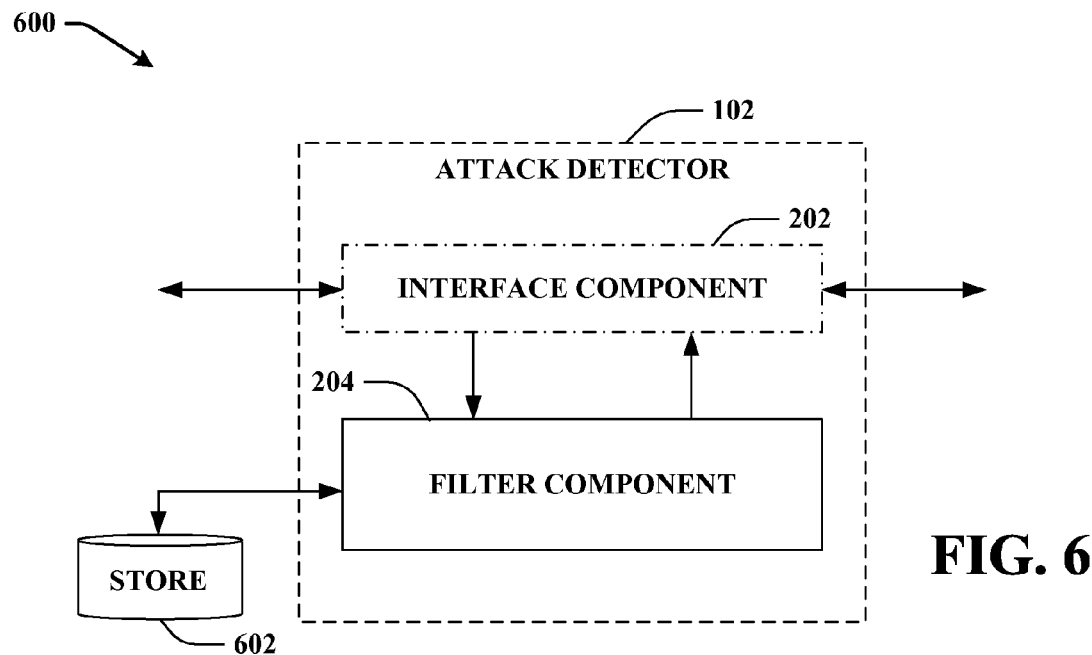
FIG. 6 provides a further depiction of a machine implemented system that automatically generates data patches for vulnerabilities in accordance with an aspect of the subject matter as claimed.

FIG. 6 depicts an aspect of a system 600 that facilitates and effectuates generation of vulnerability signatures for vulnerabilities with informed probing. System 600 can include store 602 that can include any suitable data necessary for filter component 204 to facilitate it aims. For instance, store 602 can include information regarding vulnerabilities, user data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 602 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 602 of the subject systems and methods is intended to comprise, without being limited to, these and any other suitable types of memory. In addition, it is to be appreciated that store 602 can be a server, a database, a hard drive, and the like.

Figure 7:
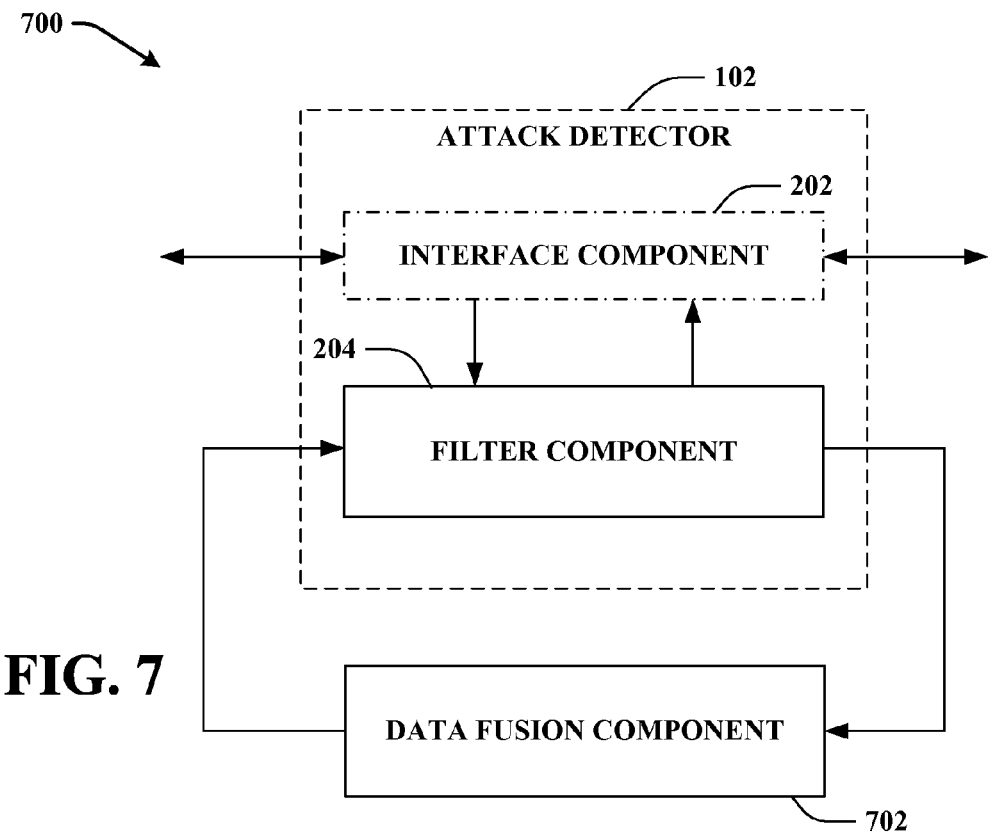
FIG. 7 illustrates yet another aspect of the machine implemented system that effectuates and facilitates automatic generation of data patches for vulnerabilities in accordance with an aspect of the claimed subject matter.

FIG. 7 provides yet a further depiction of a system 700 that facilitates and effectuates generation of vulnerability signatures for vulnerabilities with informed probing in accordance with an aspect of the claimed subject matter. As depicted, system 700 can include a data fusion component 702 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 702 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 8:
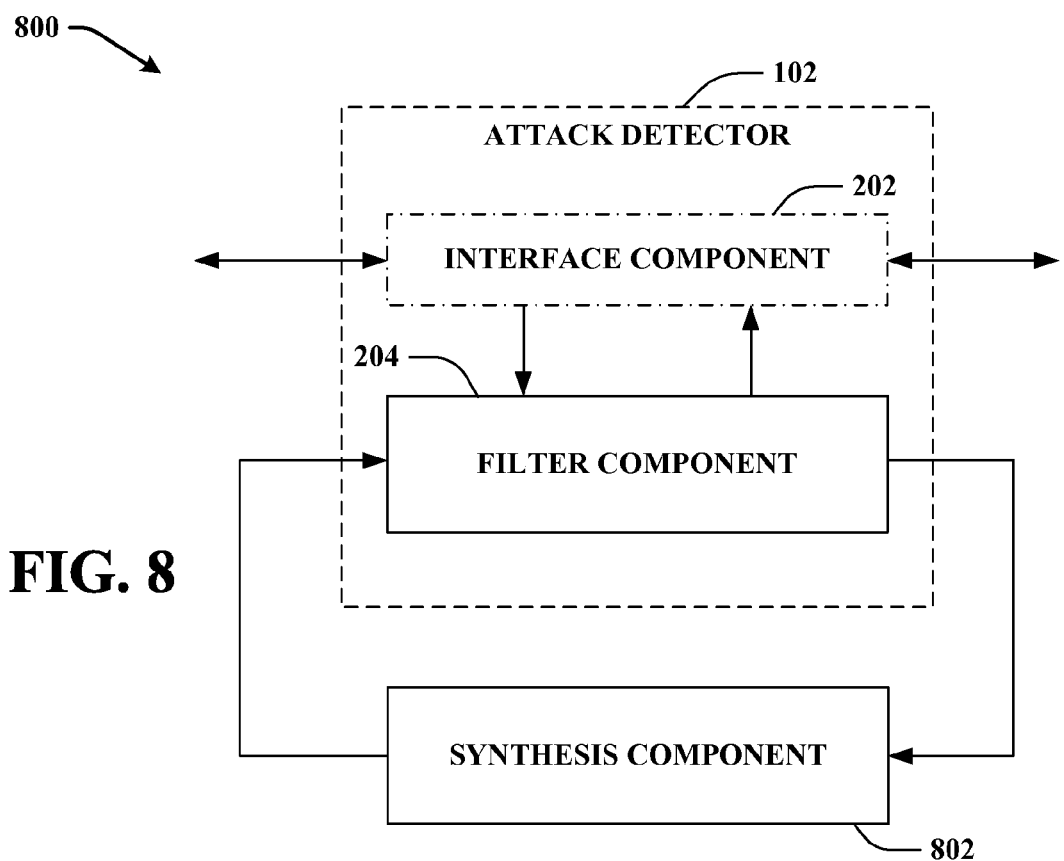
FIG. 8 depicts a further illustrative aspect of the machine implemented system that effectuates and facilitates dynamic creation of data patches for vulnerabilities in accordance with an aspect of the claimed subject matter.

FIG. 8 provides a further depiction of a system 800 that facilitates and effectuates generation of vulnerability signatures and/or data patches for vulnerabilities with informed probing in accordance with an aspect of the claimed subject matter. As illustrated filter component 204 can, for example, employ synthesizing component 802 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 802 through combining and filtering can provide a set of information that can be more informative, or accurate (e.g., with respect to an entity's communicative or informational goals) and information from just one or two modalities, for example. As discussed in connection with FIG. 7, the data fusion component 702 can be employed to learn correlations between different data types, and the synthesizing component 802 can employ such correlations in connection with combining, or filtering the input data.

Figure 9:
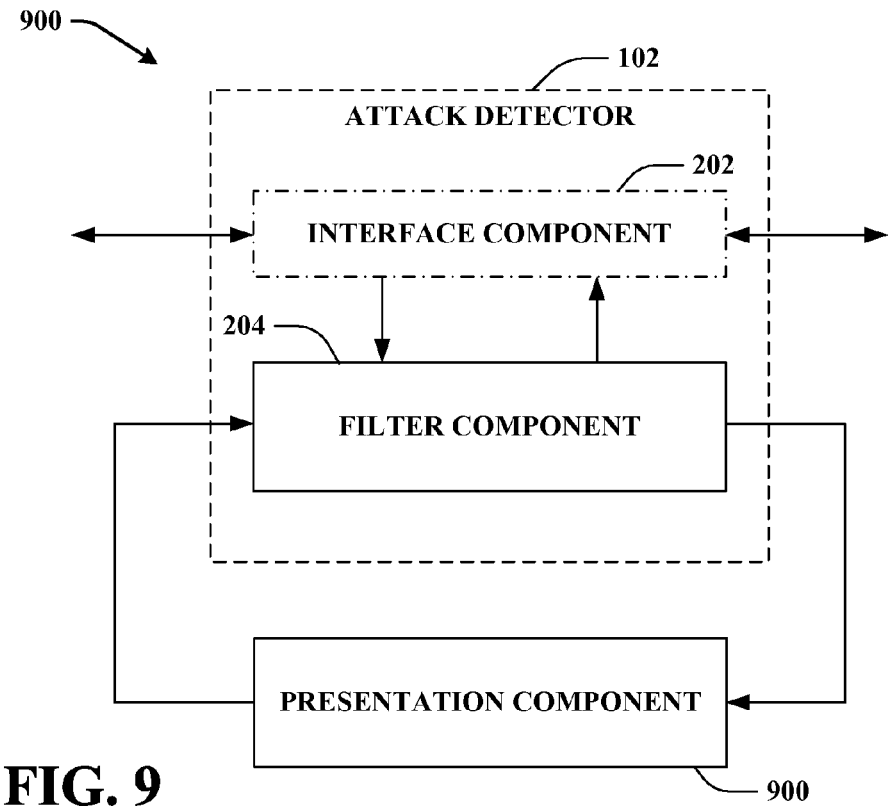
FIG. 9 depicts yet another illustrative aspect of a system that effectuates and facilitates initiation of data patches for vulnerabilities in accordance with an aspect of the subject matter as claimed.

FIG. 9 a further illustration of a system 900 that facilitates and effectuates generation of vulnerability signatures for vulnerabilities with informed probing in accordance with an aspect of the claimed subject matter. As illustrated, system 900 can include presentation component 902 that can provide various types of user interface to facilitate interaction between a user and any component coupled to filter component 204. As illustrated, presentation component 902 is a separate entity that can be utilized with filter component 204. However, it is to be appreciated that presentation component 902 and/or other similar view components can be incorporated into filter component 204 and/or a standalone unit. Presentation component 902 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed.

Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 10:
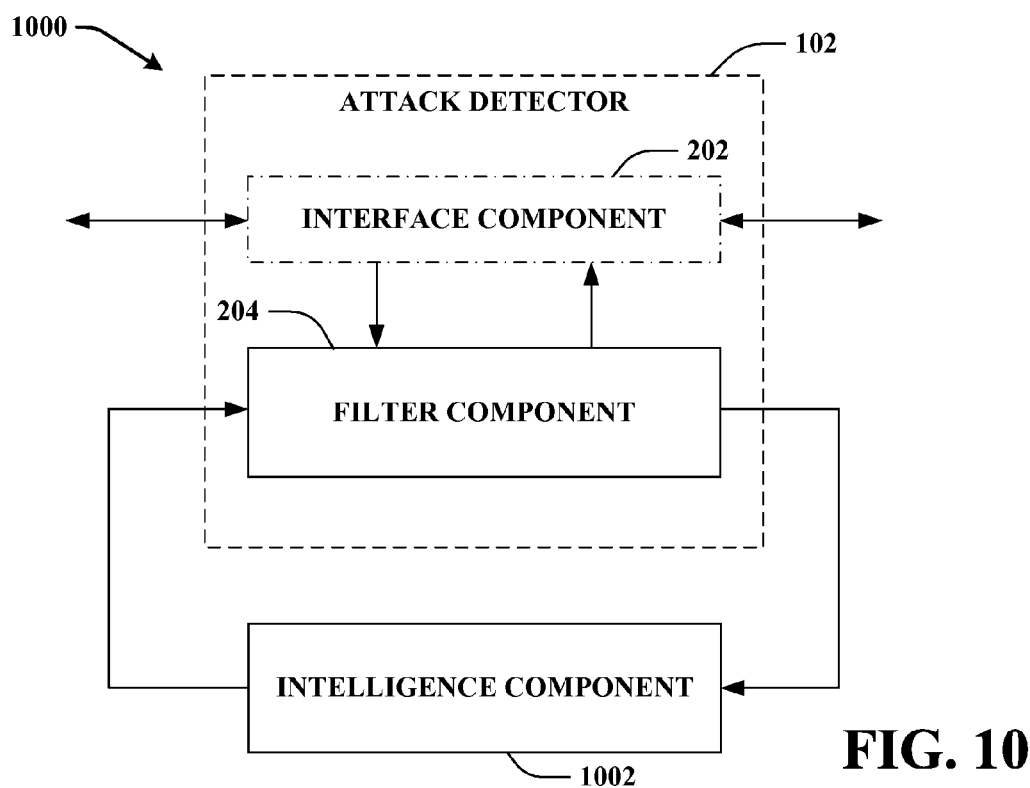
FIG. 10 depicts another illustrative aspect of a machine implemented system that effectuates and facilitates automatic generation of data patches for vulnerabilities in accordance with an aspect of the subject matter as claimed.

FIG. 10 depicts a system 1000 that employs artificial intelligence to facilitate and effectuate generation of vulnerability signatures for vulnerabilities with informed probing in accordance with an aspect of the subject matter as claimed. Accordingly, as illustrated, system 1000 can include an intelligence component 1002 that can employ a probabilistic based or statistical based approach, for example, in connection with making determinations or inferences. Inferences can be based in part upon explicit training of classifiers (not shown) before employing system 200, or implicit training based at least in part upon system feedback and/or users previous actions, commands, instructions, and the like during use of the system. Intelligence component 1002 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 1002 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 11:
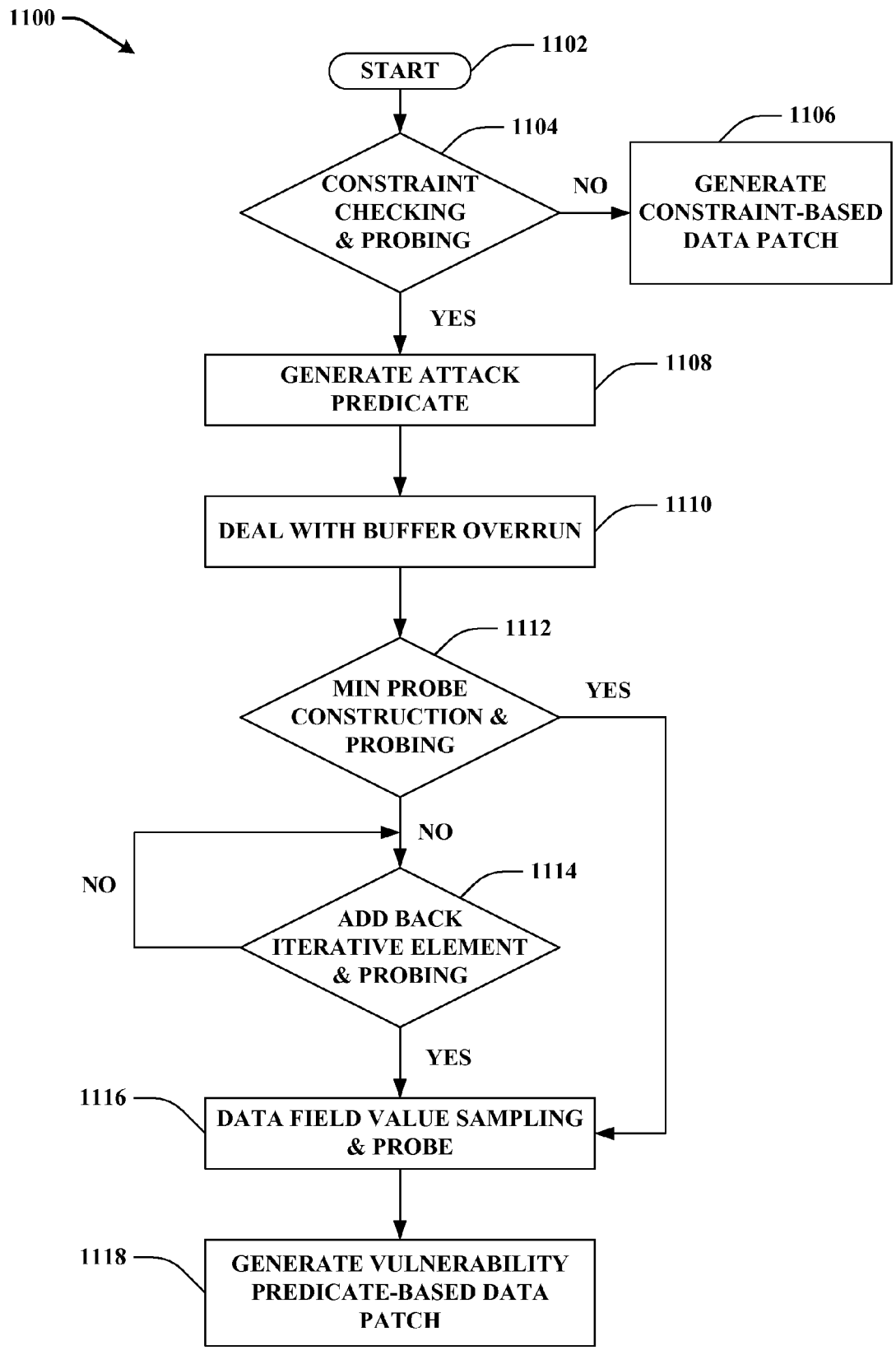
FIG. 11 illustrates a flow diagram of a machine implemented methodology that effectuates and facilitates dynamic creation of data patches for vulnerabilities in accordance with an aspect of the claimed subject matter.

In view of the exemplary systems shown and described supra, methodologies that may be implemented in accordance with the disclosed subject matter will be better appreciated with reference to the flow chart of FIG. 11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 11 provides an illustrative methodology 1100 that can be utilized by attack detector 102. At 1102 various and sundry initialization tasks can be performed after which method 1100 can proceed to 1104. At 1104 the method determines whether received or obtained attack instances violate any data format constraints. For violated constraints probes can be constructed that satisfy the constraint. If such probes are reported as failing to exploit any vulnerabilities (NO) a data patch comprising a data format specification that enforces a corresponding data format constraint can be produced at 1106. Otherwise (YES) methodology 1100 can proceed to 1108 where an attack predicate can be generated. This predicate can be a conjunction of boolean conditions with each data field equaling the value in the attack input. At 1110 the methodology can deal with buffer overruns by determining whether an offending byte lies in the middle of a byte or unicode string. If a buffer overrun is detected the following refinement condition can be added:

---
sizeof (buffer) >
offendingByte_offset − bufferStart.offset
---

At 1112 a minimal probe can be constructed and can be sent to a predictive mechanism to ascertain whether or nor the minimal probe can provide a viable attack instance. If a viable attack instance is detected, the method progresses to 1116, alternatively, if it is determined at 1112 that a viable attack instance is not forthcoming from the constructed minimal probe (NO), iterative elements previously removed can be added back to the minimal probe and the re-constructed probe sent back to the prognosticative mechanism to determine whether or not this modified probe provides a viable attack instance at 1114. Where a modified probe does not provide a viable attack (NO) the method can loop back to 1114 until such time that a viable attack instance is generated, at which point the method can progress to 1116. At 1116 fields can be evaluated one at a time while setting the values of other fields to their respective values in the original attack input, after which certain data fields (e.g., "don't care" fields) can be eliminated. On completion of data field sampling and probing at 1116 the method can proceed to 1118 at which point a vulnerability predicate-based data patch or signature can be generated.

It should be noted that method 1100 outlined above provides but one illustrative instance that can be employed to effectuate the claimed subject matter. As will be readily appreciated by those cognizant in this field of endeavor the claimed subject matter is not necessarily so limited, as a subset of the acts or a disparate ordering of the acts elucidated therein can be undertaken without departing from the intent and scope of the subject matter as claimed. Accordingly, any and all such modifications, derivations, combinations, and/or permutations are deemed to fall within the ambit and intent of the claimed subject matter.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 12:
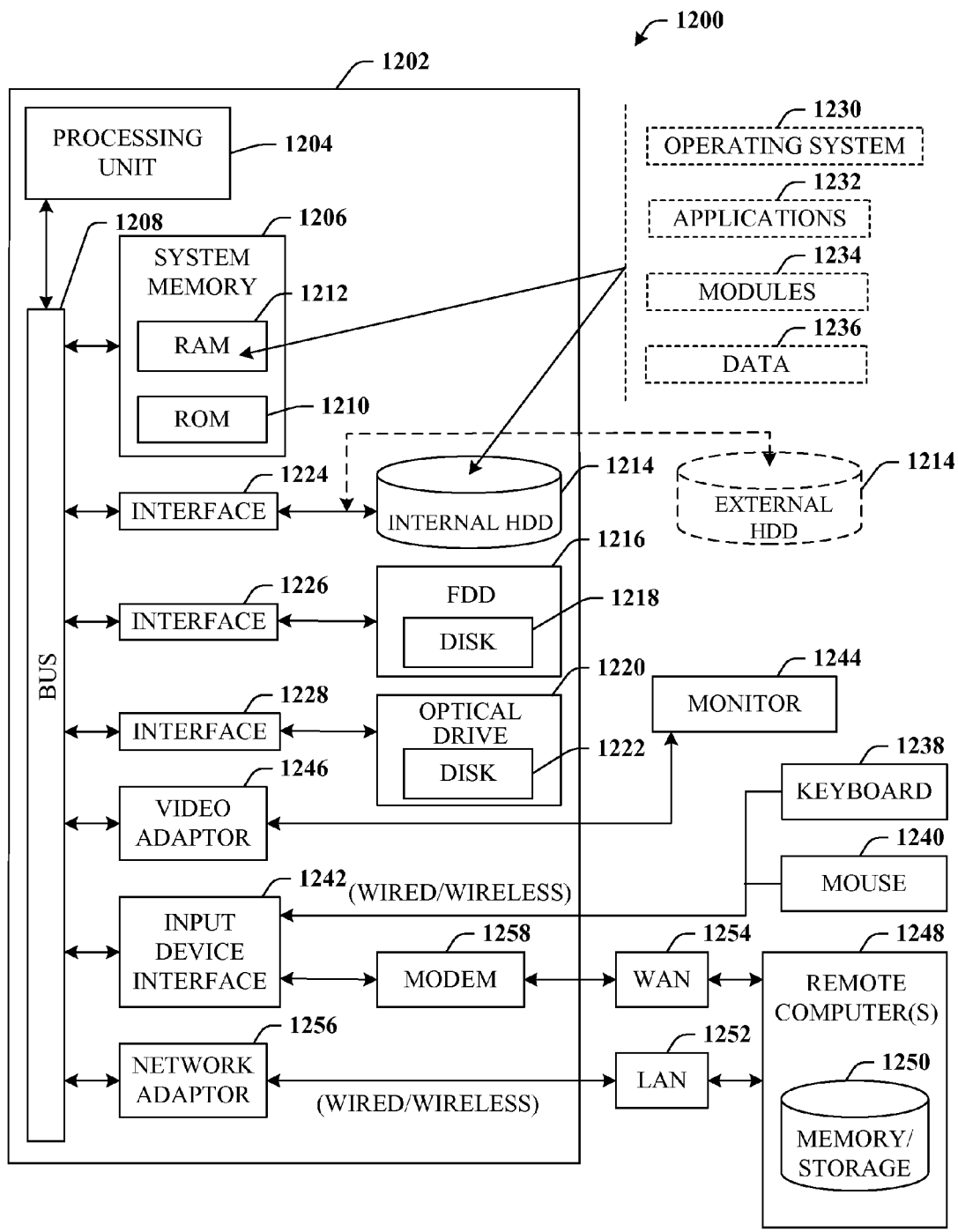
FIG. 12 illustrates a block diagram of a computer operable to execute the disclosed system in accordance with an aspect of the claimed subject matter.

Referring now to FIG. 12, there is illustrated a block diagram of a computer operable to execute the disclosed system. In order to provide additional context for various aspects thereof, FIG. 12 and the following discussion are intended to provide a brief, general description of a suitable computing environment 1200 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the claimed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 10 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 13:
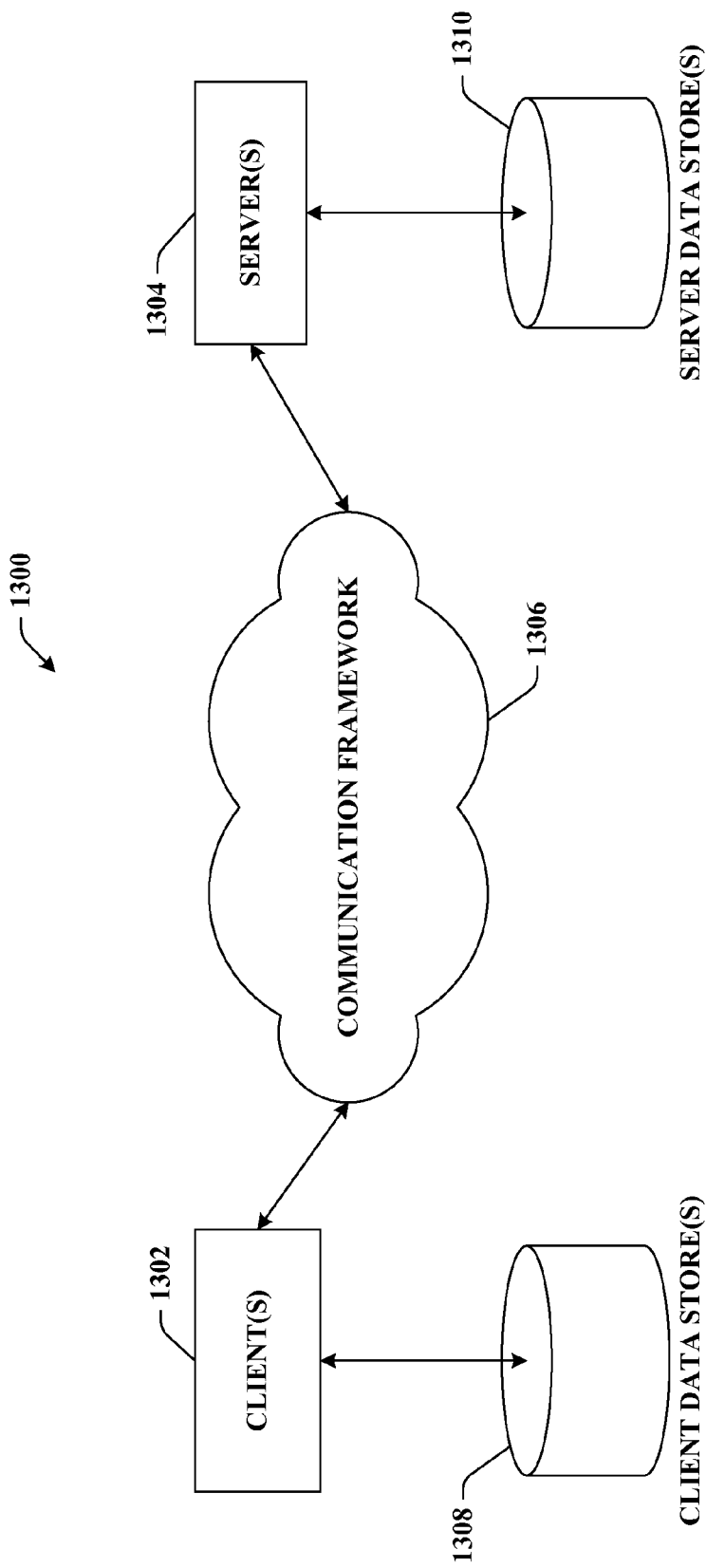
FIG. 13 illustrates a schematic block diagram of an exemplary computing environment for processing the disclosed architecture in accordance with another aspect.

Referring now to FIG. 13, there is illustrated a schematic block diagram of an exemplary computing environment 1300 for processing the disclosed architecture in accordance with another aspect. The system 1300 includes one or more client(s) 1302. The client(s) 1302 can be hardware and/or software (e.g., threads, processes, computing devices). The client(s) 1302 can house cookie(s) and/or associated contextual information by employing the claimed subject matter, for example.

The system 1300 also includes one or more server(s) 1304. The server(s) 1304 can also be hardware and/or software (e.g., threads, processes, computing devices). The servers 1304 can house threads to perform transformations by employing the claimed subject matter, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
  at least one processing device; and
  at least one computer-readable storage medium storing instructions which, when executed by the at least one processing device, cause the at least one processing device to:
    analyze a data stream having an associated data format, the data stream comprising an attack,
      generate multiple probes having multiple different values for multiple different data fields of the data format of the data stream,
      test for a vulnerability to the attack using the multiple probes, and
      generate an attack predicate for the vulnerability, the attack predicate comprising a conjunction of multiple conditions on the multiple data fields of the data stream, the attack predicate being generated by:
        relaxing a first condition of the multiple conditions, and
        relaxing a second condition of the multiple conditions.

2. The system of claim 1, wherein the first condition identifies a first specific value of the attack for the first data field and the second condition identifies a second specific value of the attack for the second data field.

3. The system of claim 2, wherein the relaxed first condition identifies additional first values other than the first specific value and the relaxed second condition identifies additional second values other than the second specific value.

4. The system of claim 3, wherein the instructions further cause the at least one processing device to:
  generate a predicate-based data patch using the attack predicate.

5. The system of claim 4, wherein the predicate-based data patch is configured to be utilized as a data filter in a network security device or a filtering application.

6. The system of claim 1, wherein the instructions further cause the at least one processing device to:
 identify a violation of a format constraint associated with the data format of the data stream;
 based on the violation of the format constraint, generate an individual probe that satisfies the format constraint; and
 determine whether the individual probe that satisfies the format constraint exploits the vulnerability.

7. The system of claim 1, wherein the multiple probes are configured to uncover a new potential attack variant that is identified by the attack predicate.

8. The system of claim 1, wherein the data stream is obtained or received from a crash dump or a honeyfarm.

9. The system of claim 1, wherein the instructions further cause the at least one processing device to:
 remove a third condition on a third data field of the data format.

10. The system of claim 1, wherein the data format is specified using a domain-specific language.

11. The system of claim 1, wherein the instructions further cause the at least one processing device to:
 enforce dependency constraints across the multiple different data fields to prevent construction of invalid probes.

12. The system of claim 1, wherein the instructions further cause the at least one processing device to:
 employ dynamic dataflow analysis to generate the multiple probes.

13. The system of claim 1, wherein:
 the relaxing the first condition comprises obtaining a first relaxed condition on a first data field of the data stream, and
 the relaxing the second condition comprises obtaining a second relaxed condition on a second data field of the data stream.

14. A method performed by at least one computer processing device, the method comprising:
 detecting an exploit received from a data stream having an associated data format identifying multiple data fields of the data stream;
 creating multiple different probes based on the exploit by:
  using one or more of the multiple different probes to identify an individual field of the format that does not affect the exploit, and
  eliminating an individual condition on the individual field of the format that does not affect the exploit when generating additional probes of the multiple different probes;
 ascertaining whether the multiple different probes make evident at least one vulnerability; and
 automatically generating a data patch for the at least one vulnerability.

15. The method of claim 14, wherein the one or more of the multiple different probes comprise multiple different values of the individual field of the format that does not affect the exploit.

16. The method of claim 14, further comprising:
 generating an attack predicate comprising a conjunction of multiple conditions on the multiple data fields of the data stream, the multiple conditions excluding the individual condition on the individual field of the format that does not affect the exploit.

17. The method of claim 16, wherein creating the multiple different probes comprises:
 relaxing a first condition on the individual field of the format, and
 relaxing a second condition on another individual field of the format.

18. The method of claim 17, wherein the relaxing comprises trying all possible values of the individual field, and determining that the individual field does not affect the exploit when the exploit occurs for all of the possible values of the individual field.

19. The method of claim 14, wherein the generating the additional probes comprises varying other fields of the format without varying values of the individual field of the format that does not affect the exploit.

20. A computer-readable storage device storing instructions executable by a processing device that, when executed by the processing device, cause the processing device to perform operations comprising:
 creating multiple different probes based on a received attack message that exploits at least one vulnerability, the received attack message having an associated protocol with multiple different protocol states;
 using the multiple different probes to identify a first protocol state in which the attack message is not sent and a second protocol state in which the attack message is sent; and
 dynamically creating a data patch to cure the at least one vulnerability, wherein the data patch:
  identifies the second protocol state in which the attack message is sent, and
  has an attack predicate that includes conditions on fields of the attack message that is sent in the second protocol state and excludes conditions on other fields of one or more other messages that are sent in the first protocol state.

21. The computer-readable storage device of claim 20, wherein the second protocol state corresponds to a last message in a message sequence of the protocol and the first protocol state corresponds to one or more other messages of the protocol other than the last message.

22. The computer-readable storage device of claim 20, wherein the data patch protects against multiple different sequences of messages that provide the attack message in the second protocol state.

23. The computer-readable storage device of claim 20, the operations comprising:
 using a protocol state machine to determine when the protocol is in the first protocol state and when the protocol is in the second protocol state.

* * * * *